(12) United States Patent
Braziunas et al.

(10) Patent No.: US 9,842,110 B2
(45) Date of Patent: Dec. 12, 2017

(54) CONTENT BASED SIMILARITY DETECTION

(71) Applicant: Rakuten Kobo Inc., Toronto (CA)

(72) Inventors: Darius Braziunas, Toronto (CA);
Jordan Christensen, Toronto (CA);
Inmar Ella Givoni, Toronto (CA); Neil Isaac, Toronto (CA)

(73) Assignee: Rakuten Kobo Inc., Toronto (CA)

(*) Notice: Subject to any disclaimer, the term of this patent is extended or adjusted under 35 U.S.C. 154(b) by 872 days.

(21) Appl. No.: 14/219,613

(22) Filed: Mar. 19, 2014

(65) Prior Publication Data
US 2015/0154497 A1  Jun. 4, 2015

Related U.S. Application Data

(63) Continuation-in-part of application No. 14/097,078, filed on Dec. 4, 2013, now Pat. No. 9,519,922.

(51) Int. Cl.
*G06F 17/30* (2006.01)
*G06N 99/00* (2010.01)

(52) U.S. Cl.
CPC ...... *G06F 17/30011* (2013.01); *G06N 99/005* (2013.01)

(58) Field of Classification Search
CPC ........................ G06F 17/30011; G06N 99/005
See application file for complete search history.

(56) References Cited

U.S. PATENT DOCUMENTS

| | | | | |
|---|---|---|---|---|
| 7,814,107 B1* | 10/2010 | Thirumalai | ....... | G06F 17/30011 707/749 |
| 2009/0319515 A1* | 12/2009 | Minton | ............ | G06F 17/30303 |
| 2011/0219012 A1* | 9/2011 | Yih | .......................... | G06F 17/30 707/749 |
| 2013/0212090 A1* | 8/2013 | Sperling | ............. | G06F 17/3069 707/723 |
| 2014/0067728 A1* | 3/2014 | Ogren | ............... | G06F 17/30569 706/12 |
| 2014/0082006 A1* | 3/2014 | Knight | ............. | G06F 17/30628 707/758 |

* cited by examiner

*Primary Examiner* — Arvin Eskandarnia
*Assistant Examiner* — Gil H. Lee
(74) *Attorney, Agent, or Firm* — Oblon, McClelland, Maier & Neustadt, L.L.P.

(57) ABSTRACT

Content Based Similarity Detection. A computer implemented method includes computing a hash of each word in a collection of books to produce a numerical integer token using a reduced representation and computing an Inverse Document Frequency (IDF) vector comprising the number of books the token appears in, for every token in the collection of books. The method also includes creating a token occurrence count vector for each book in the collection and normalizing the token occurrence count vector using the IDF vector to create a Term Frequency-Inverse Document Frequency (TF-IDF) vector. Further, the method includes reducing each TF-IDF vector by using random projections to obtain a final signature representing each book in the collection, reducing each TF-IDF vector by using random projections to obtain a final signature representing each book in the collection and using a trained machine learning algorithm, determining whether each of the list of candidate books is similar to the target book.

18 Claims, 2 Drawing Sheets

CONTENT BASED SIMILARITY DETECTION

RELATED APPLICATIONS

This application is a Continuation-in-Part of co-pending, commonly owned U.S. patent application Ser. No. 14/097,078, filed Dec. 4, 2013, entitled "System and Method for Automatic Electronic Document Identification," to Christensen and Braziunas, which is hereby incorporated herein by reference in its entirety.

This application is related to co-pending, commonly owned U.S. patent application Ser. No. 13/931,563, entitled "System and Method for a Graphical User Interface Having Recommendations," with filing date Jun. 28, 2013, which is hereby incorporated herein by reference in its entirety.

FIELD OF INVENTION

Embodiments of the present invention relate to the field of information comparison. More specifically, embodiments of the present invention relate to systems and methods for content based similarity detections.

BACKGROUND

In the electronic publications arts, it is often desirable to determine when two digital volumes contain the same, or approximately the same, content. As an example, consider two instances of the same book made available by different publishers. A simple word-for-word comparison may identify numerous superficial differences, including, for example, different spellings, e.g., American versus British English, different cultural references, e.g., "pharmacist" versus "chemist," differences in formatting and/or layout and the like. While such differences may be numerous, the underlying content may be substantially similar.

It is often the case that metadata is provided with the digitized text of a book. Such metadata may include, for example, the author, title, publisher, International Standard Book Number (ISBN), and additional identification information. While it may seem that the metadata can serve to determine book similarities, it has been observed that due to a variety of reasons, including, for example, human error, formatting inconsistencies, and deliberate deceit, metadata is not a reliable enough source upon which to determine content similarities.

SUMMARY OF THE INVENTION

Therefore, what is needed are systems and methods for content based similarity detection. What is additionally needed are systems and methods for content based similarity detection that determine potential matches among electronic books based on a comparison of more than one type of similarity score. A further need exists for systems and methods for content based similarity detection that are compatible and complementary with existing systems and methods of electronic book storage and distribution, including sales of such electronic books. Embodiments of the present invention provide these advantages.

In accordance with a first method embodiment of the present invention, a computer implemented method includes computing a hash of each word in a collection of books to produce a numerical integer token using a reduced representation and computing an Inverse Document Frequency (IDF) vector comprising the number of books the token appears in, for every token in the collection of books. The method also includes creating a token occurrence count vector for each book in the collection and normalizing the token occurrence count vector using the IDF vector to create a Term Frequency-Inverse Document Frequency (TF-IDF) vector. Further, the method includes reducing each TF-IDF vector by using random projections to obtain a final signature representing each book in the collection, reducing each TF-IDF vector by using random projections to obtain a final signature representing each book in the collection and using a trained machine learning algorithm, determining whether each of the list of candidate books is similar to the target book.

In accordance with another embodiment of the present invention, an article of manufacture includes a computer readable medium having instructions stored thereon that, responsive to execution by an electronic system, cause the electronic system to perform operations including computing a hash of each word in a collection of books to produce a numerical integer token using a reduced representation and computing an Inverse Document Frequency (IDF) vector comprising the number of books the token appears in, for every token in the collection of books. The operations also include creating a token occurrence count vector for each book in the collection and normalizing the token occurrence count vector using the IDF vector to create a Term Frequency-Inverse Document Frequency (TF-IDF) vector. Further, the operations include reducing each TF-IDF vector by using random projections to obtain a final signature representing each book in the collection, reducing each TF-IDF vector by using random projections to obtain a final signature representing each book in the collection and using a trained machine learning algorithm, determining whether each of the list of candidate books is similar to the target book.

In accordance with a further embodiment of the present invention, an electronic system includes one or more processors and a memory coupled to the one or more processors. The memory includes a plurality of electronic books. The electronic system is configured to compute a hash of each word in a collection of books to produce a numerical integer token using a reduced representation and compute an Inverse Document Frequency (IDF) vector comprising the number of books the token appears in, for every token in the collection of books. The electronic system is also configured to create a token occurrence count vector for each book in the collection and normalize the token occurrence count vector using the IDF vector to create a Term Frequency-Inverse Document Frequency (TF-IDF) vector. Further, the electronic system is configured to reduce each TF-IDF vector by using random projections to obtain a final signature representing each book in the collection, reducing each TF-IDF vector by using random projections to obtain a final signature representing each book in the collection and using a trained machine learning algorithm, determine whether each of the list of candidate books is similar to the target book.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings are not drawn to scale.

DETAILED DESCRIPTION

Figure 1:
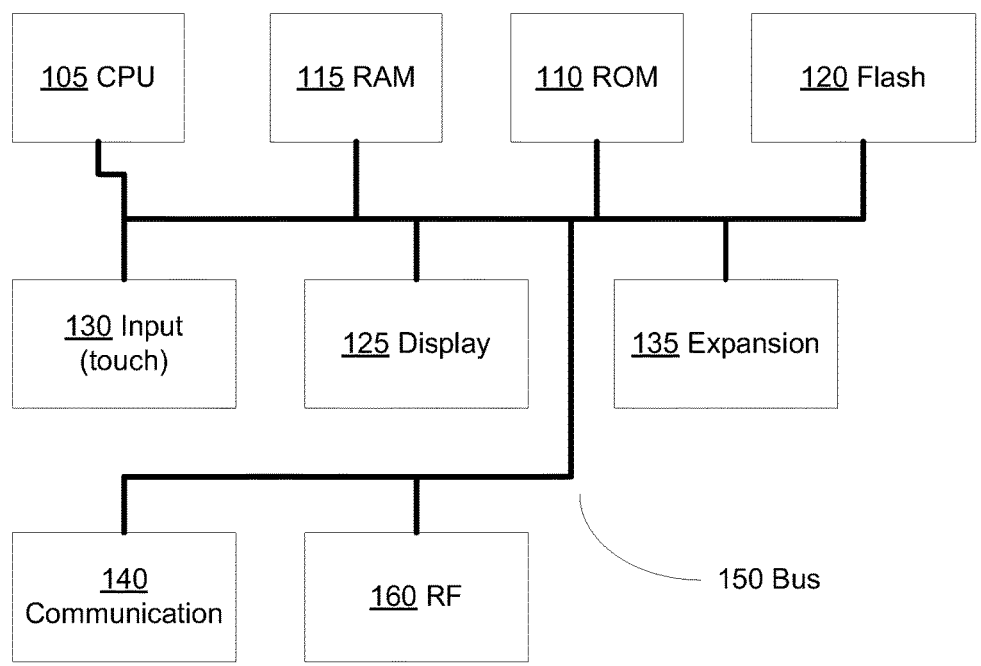
FIG. 1 illustrates an exemplary block diagram of an exemplary electronic system, which may be used as a platform to implement embodiments of the present invention.

Reference will now be made in detail to various embodiments of the present invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Notation and Nomenclature

Some portions of the detailed descriptions which follow (e.g., method 200) are presented in terms of procedures, steps, logic blocks, processing, and other symbolic representations of operations on data bits that may be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "computing" or "normalizing" or "creating" or "reducing" or "displaying" or "detecting" or "determining" or "setting" or "accessing" or "placing" or "testing" or "forming" or "mounting" or "removing" or "ceasing" or "stopping" or "coating" or "processing" or "performing" or "generating" or "adjusting" or "creating" or "executing" or "continuing" or "indexing" or "translating" or "calculating" or "measuring" or "gathering" or "running" or the like, refer to the action and processes of, or under the control of, a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As used herein, the terms "book," "e-book" or "electronic book" are used to refer to or to describe a digital instance of a textual, or primarily text-based content. Such content may commonly be known or referred to as a "book," "e-book," "magazine," "article," "story" or the like.

Content Based Similarity Detection

FIG. 1 illustrates an exemplary block diagram of an exemplary electronic system 100, which may be used as a platform to implement embodiments of the present invention. Electronic system 100 may be battery-powered, in some embodiments. In some embodiments, electronic system 100 may be a "server" computer. Electronic system 100 includes an address/data bus 150 for communicating information, a central processor 105 functionally coupled with the bus for processing information and instructions. Central processor 105 may comprise multiple processors, e.g., a multi-core processor, or multiple separate processors, in some embodiments. Electronic system 100 also includes a volatile memory 115 (e.g., random access memory RAM) coupled with the bus 150 for storing information and instructions for the central processor 105, and a non-volatile memory 110 (e.g., read only memory ROM) coupled with the bus 150 for storing static information and instructions for the processor 105. Electronic system 100 also optionally includes a changeable, non-volatile memory 120 (e.g., flash) for storing information and instructions for the central processor 105 which can be updated after the manufacture of system 100. In some embodiments, only one of ROM 110 or Flash 120 may be present.

Also included in electronic system 100 of FIG. 1 is an optional input device 130. Device 130 can communicate information and command selections to the central processor 105. Input device 130 may be any suitable device for communicating information and/or commands to the electronic system 100. For example, input device 130 may take the form of a keyboard, buttons, a joystick, a track ball, an audio transducer, e.g., a microphone, a touch sensitive digitizer panel, eyeball scanner and/or the like. A touch sensitive digitizer panel may comprise any suitable technology, e.g., capacitive, resistive, optical, acoustic and/or pressure responsive touch panels. Activation of a "touch" sensitive digitizer panel may not require actual touching of the panel 130 or the electronic system 100, in some embodiments. For example, capacitive touch panels may sense proximity of a user's finger or an eyeball scanner may detect a direction of a user's gaze.

The display unit 125 utilized with the electronic system 100 may comprise a liquid crystal display (LCD) device, cathode ray tube (CRT), field emission device (FED, also called flat panel CRT), light emitting diode (LED), plasma display device, electro-luminescent display, electronic paper, electronic ink (e-ink) or other display device suitable for creating graphic images and/or alphanumeric characters recognizable to the user. Display unit 125 may have an associated lighting device, in some embodiments. Display unit 125 may comprise a head-mounted display, in some embodiments.

A touch sensitive digitizer panel 130 is generally associated with the display unit 125. For example, a function of the touch sensitive digitizer panel 130 generally associated with the display unit 125 is to localize a touch input, e.g., from a finger or stylus, to a portion of display unit 125, for example, a single icon image displayed on display unit 125. The touch sensitive digitizer panel may be in front of the actual display device, e.g., in a viewer's optical path, or the touch sensitive digitizer panel may be outside of a viewer's optical path, e.g., behind or to the side of the display device. The touch sensitive digitizer panel 130 may have different planar dimensions in comparison to planar dimensions of a display unit 125. For example, the touch sensitive digitizer panel 130 may be smaller than display unit 125, e.g., the display unit 125 may extend beyond the touch sensitive digitizer panel 130. Similarly, the touch sensitive digitizer panel 130 may be larger than display unit 125, e.g., the touch panel may extend beyond the display unit. The touch sensitive digitizer panel may be integral to a display assembly, or a separate assembly within the electronic system 100. A touch sensitive digitizer panel is not required.

Electronic system 100 also optionally includes an expansion interface 135 coupled with the bus 150. Expansion interface 135 can implement many well known standard expansion interfaces, including without limitation the Secure Digital Card interface, universal serial bus (USB) interface, Compact Flash, Personal Computer (PC) Card interface, CardBus, Peripheral Component Interconnect (PCI) interface, Peripheral Component Interconnect Express (PCI Express), mini-PCI interface, IEEE 1394, Small Computer System Interface (SCSI), Personal Computer Memory Card International Association (PCMCIA) interface, Industry Standard Architecture (ISA) interface, RS-232 interface, and/or the like. In some embodiments of the present invention, expansion interface 135 may consist of signals substantially compliant with the signals of bus 150.

A wide variety of well known devices may be attached to electronic system 100 via the bus 150 and/or expansion interface 135. Examples of such devices include without limitation rotating magnetic memory devices, flash memory devices, digital cameras, wireless communication modules, digital audio players and Global Positioning System (GPS) devices.

System 100 also optionally includes a communication port 140. Communication port 140 may be implemented as part of expansion interface 135. When implemented as a separate interface, communication port 140 may typically be used to exchange information with other devices via communication-oriented data transfer protocols. Examples of communication-oriented ports include without limitation RS-232 ports, universal asynchronous receiver transmitters (UARTs), USB ports, infrared light transceivers, ethernet ports, IEEE 1394 and synchronous ports.

System 100 optionally includes a radio frequency module 160, which may implement a mobile telephone, a wireless network, e.g., IEEE 802.11 ("Wi-Fi"), Bluetooth, a pager, or a digital data link. Radio frequency module 160 may be interfaced directly to bus 150, via communication port 140, via expansion interface 135, or any suitable interface. Various features of electronic system 100 may be implemented by a combination of hardware and/or software. Electronic system 100 may comprise additional software and/or hardware features (not shown) in some embodiments.

Various modules of system 100 may access computer readable media, and the term is known or understood to include removable media, for example, Secure Digital ("SD") cards, CD and/or DVD ROMs, diskettes and the like, as well as non-removable or internal media, for example, hard drives, RAM, ROM, flash, and the like.

There are many applications for which determining if two or more books, e.g., digital content files, are similar is desirable. Exemplary applications include:

Plagiarism Detection. This applies, for example, to the domain of self-publishing platforms, where an individual can upload any book content she has written to an "ePub" (electronic Publications) store and charge for downloads of the book. In such cases it is often the responsibility of the hosting service or store to ensure that the uploaded content does not violate a copyright of another party. Embodiments in accordance with the present invention may identify a plagiaristic upload and help to prevent copyright violations.

Bad Metadata Detection. Metadata generally refers to identifying information that is adjunct to the main body of content, and may include, for example, the author, title, publisher, International Standard Book Number (ISBN), press run number, and additional identification information. This information may be incorrectly associated with the wrong content. Embodiments in accordance with the present invention may identify similar books having different, faulty meta-data to improve the overall quality of the data warehouse.

Consistent Data Collection and Analysis. Similar books may have different, non-faulty metadata due to multiple publishers, regional variants, annotated versions, condensed versions, and the like. It may be desirable to collect information, e.g., user statistics, sales data and/or other measurements, related to the book as an entity, rather than as multiple, particular instances of the book. For example, such a comparison enables reliably determining the popularity of a book based on its overall sales. Embodiments in accordance with the present invention may identify multiple variations of a book as the same book, and enable collection of cumulative statistics on the book.

Computational Speedup and Accuracy Improvement. It is generally desirable to decrease effort and improve accuracy in computational intensive algorithms such as book recommendations, which scale in execution time with the number of books available in the corpus and/or used in the algorithm. Recommendations are often based on processing a matrix of books read and/or recommended by other users of an online book store. By detecting that different entities in the matrix refer to the same book, the entities can be combined, leading to smaller input and thus faster and more accurate computations. Embodiments in accordance with the present invention may improve algorithmic manipulations of book comparisons, thereby decreasing computational requirements and increasing accuracy for such comparisons, e.g., recommendations.

Presentation in an Online Store. An online catalog may contain many different versions of the same book. It may be desirable to display only one or few of them, for a better user experience. Embodiments in accordance with the present invention may provide identification of different versions of the same book, thus enabling grouping or consolidation of lists of available matter.

A content based similarity detection system generally cannot rely on exact text matching. There are several reasons why two instances of the same book may not be identical in terms of their content. The term "core text" is used to denote, describe or refer to the text of the actual book, as opposed to "flanking text," which refers to other pieces of text, such as accolades for the book, acknowledgments, forward, publisher's page, "about the author" notes, samples from new upcoming books, a list of other titles from the author, and the like. Many books contain "flanking text." It is to be appreciated that such flanking text is subject to change as different editions of the book are published, different publishers make the book available, etc.

The core text may also be modified, for example, due to corrections between editions. Another reason for changes in core text is due to modifications for localization purposes in different geographical locations. For example, American English differs from British English, and analogous differences occur in other languages as well. A famous example is the change made to the title of the first book in the Harry Potter series, published in the United Kingdom as "Harry Potter and the Philosopher's Stone" and in the United States as "Harry Potter and the Sorcerer's Stone."

Due to such circumstances, a robust book similarity detection system should match similarities based on the statistics of the text, while allowing for some minor amount of differences. However, such a similarity detection system should establish a "finger-print" calculation that is highly unique for a book, despite minor differences such as those described above. In addition, since such a system may need to deal with vast numbers of books, e.g., measured in the millions of books, a similarity detection system must be computationally efficient.

In addition, it is desirable that a book similarity detection system should be language agnostic. For example, any two books written in the same language should be reliably compared using the same system.

In information retrieval, text documents may be represented as vectors in multidimensional space where each dimension represents a word. The size of a vector that represents a particular book is the size of the corpus dictionary, e.g., the number of distinct terms in all the documents in the corpus. In practice, the dictionary size could be very large, e.g., comprising millions of terms. For many practical purposes, including computing similarities between documents, the size of the dictionary may be reduced by using a hash function, e.g., the MurmurHash3 x86 32 function or the like, to map each distinct term to a smaller number, e.g., a 32-bit or 64-bit integer, and then using only the first B bits of the hashed integer value to represent each term. An exemplary practical value is B=18 bits, resulting in a vector size of $2^{18}$=262,144. While in this case two different terms might end up treated as the same e.g., because the first B bits of their hash values are identical, for similarity computations such collisions are very rare and effectively inconsequential. It is appreciated that embodiments in accordance with the present invention are well suited to other hashing functions and methods of information reduction.

One popular text as vector representation is known as or referred to as the "Term Frequency-Inverse Document Frequency" (TF-IDF) representation, where a given term is represented by the fraction of times it occurs in the document divided by the log fraction of all documents in the corpus that the term appears in. In such a way, terms with high TF-IDF values are most relevant to representing a given document. For example, such terms appear with high frequency within a document, but are less common in other documents.

Figure 2:
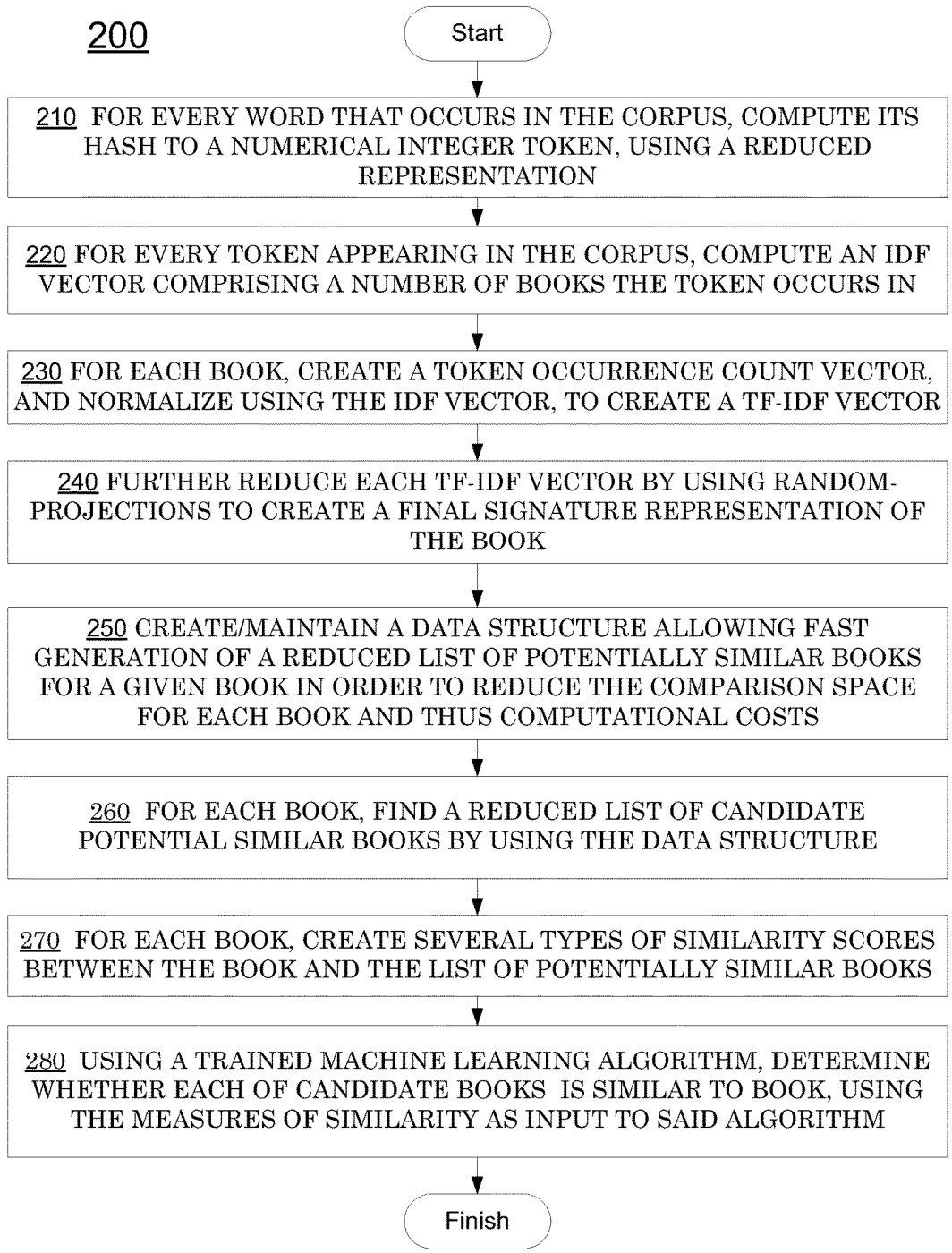
FIG. 2 illustrates a method, in accordance with embodiments of the present invention.

FIG. 2 illustrates a method 200, in accordance with embodiments of the present invention. In 210, for every word that occurs in a comparison space or "corpus," e.g., a collection of books, a numerical integer token is computed by hashing the word and using a reduced representation, for example, 18-bits. Word counts may be obtained by scanning the text of a book or similar text.

A sparse vector of size $2^{18}$ may be considered to be too large for efficient pair-wise computation. A standard computational approach using the method of random projections is to generate a much smaller (e.g. 2,048 bit) binary vector from the TF-IDF vector with the property that if two TF-IDF vectors are similar in terms of their cosine similarity, then the hamming distance of their corresponding binary vector is very small.

In 220, an IDF vector is computed, comprising the number of books each token occurs in, for each of the tokens appearing in the corpus. In 230, for each book, compute a token occurrence count vector, and then normalize the IDF vector to obtain the 'TF-IDF' vector for the book. In 240 each TF-IDF vector is further reduced by using random-projections to obtain a final "signature" representation of the book. More information on methods of random-projections may be found in U.S. patent application Ser. No. 14/097,078, which is hereby incorporated herein by reference in its entirety.

From a practical stand-point, finding all similar books in a corpus is an Order($n^2$) calculation, where n is the number of books in the corpus. One way to reduce the computational effort is, when computing similarities of the entire corpus against vector u, a list of plausible candidates $u_1, \ldots, u_m$ is generated to compute similarities against such the probability of any similar vector to u being outside the retained set is very $\{u_i\}_{i=1}^m$ small, but where the size of m<<n.

In optional 250, an efficient data structure is created and maintained such that it is computationally efficient to create a reduced list of potentially matching books for each book, in order to reduce computational requirements. Given the top NTF-IDF terms of all books, where N<<$2^{18}$ (for example, N=50), a reversed index is built where the key is a particular TF-IDF term and the value is a list of all books having that term among their top N terms.

In optional 260, given such an efficient data structure, and given a new book b to process, and its top NTF-IDF terms, the list of books that have at least M percent of the top N terms is found, and the full similarity only needs to be computed against that subset of books. This gives significant speed-ups to the comparison process. Setting M to a reasonably conservative value, for example, 50 percent, ensures that the probability of missing a similar book is negligible. N and M are tuned to minimize the number of comparisons and at the same time minimize the chances of missing a similarity.

For a comparison between any two books, several measures of vector similarity and book-similarity are employed. In 270, the multiple measures are combined together in order to come up with a final similarity measure. The cosine similarity is approximated by the hamming distance of the signature binary vectors. In addition to the binary vector generated from the random projection of the full TF-IDF vector, two additional binary vectors are generated by removing the first TF-IDF term and the first two TF-IDF terms from the TF-IDF vectors prior to applying the random projection method to obtain a binary vector. This provides three variants of binary vector representations of the TF-IDF vector per book, and these can be compared respectively with their counterparts from another book. This lends robustness to the computation. Thus resulting in $\cos_0(u, v)$; $\cos_1(u, v)$; $\cos_2(u, v)$ respectively for every pair of vectors.

In addition, the top 1,000 TF-IDF entries of each vector are utilized to form two sets. The Jaccard similarity may be calculated as the intersection size as a fraction of the union size, as shown in Relation 1, below:

$$Jac(u, v) = \frac{u \cap v}{u \cup v} \qquad \text{(Relation 1)}$$

Note that the Jaccard measure is 1 when the two vectors are identical, and 0 when they are completely disjoint.

Books that are too short to be relevant candidates for similarity detection are discarded. The number of words in each book is utilized to compute a final measure of similarity. The final measure of similarity is specifically tailored to prevent detecting similarity between an excerpt from a book and the full book:

$$SizeSim(u, v) = \frac{|u| - |v|}{|u| + |v|} \quad \text{(Relation 2)}$$

There are several ways to combine the collection of similarity measures obtained (cos0, cos1, cos2, Jac, SizeSim). One way is to hand-tune a function combining the numbers. Another approach is to use training data on similar and dissimilar volumes to fit a parameterized function and choose a good threshold. In 280, a trained machine learning algorithm decides whether two books are the same or not based on similarity scores and other features. Combined similarity measure above the threshold for any two books will indicate that they are similar, as determined by the system.

Embodiments in accordance with the present invention provide systems and methods for content based similarity detection. In addition, embodiments in accordance with the present invention provide systems and methods for content based similarity detection that determine potential matches among electronic books based on a comparison of more than one type of similarity score. Further, embodiments in accordance with the present invention provide systems and methods for content based similarity detection that are compatible and complementary with existing systems and methods of electronic book storage and distribution, including sales of such electronic books.

Various embodiments of the invention are thus described. While the present invention has been described in particular embodiments, it should be appreciated that the invention should not be construed as limited by such embodiments, but rather construed according to the below claims.

What is claimed is:

1. A computer implemented method comprising:
   computing a hash of each word in a collection of books to produce a numerical integer token using a reduced representation;
   computing an Inverse Document Frequency (IDF) vector comprising a number of books said token appears in, for every token in said collection of books;
   creating a token occurrence count vector for each said book in said collection;
   normalizing said token occurrence count vector using said IDF vector to create a Term Frequency-Inverse Document Frequency (TF-IDF) vector;
   generating, for each said book, a first reduced TF-IDF vector by removing a TF-IDF term with highest weight from the TF-IDF vector;
   generating, for each said book, a second reduced TF-IDF vector by removing two TF-IDF terms with highest weights from the TF-IDF vector;
   generating, for each said book, three variants of binary vector representations by applying random projections to the TF-IDF vector, the first reduced TF-IDF vector, and the second reduced TF-IDF vector,
   creating a similarity score for each variant of binary vector representations of a target book by comparing respectively with counterpart variant from each of a list of candidate books;
   combining the multiple similarity scores to arrive at a final similarity measurement; and
   using a trained machine learning algorithm, determining whether each of said list of candidate books is similar to said target book based at least in part on the final similarity measurement.

2. The computer implemented method of claim 1 further comprising:
   creating an efficient data structure to create a reduced list of potentially matching books for each said book in said collection to reduce computational costs.

3. The computer implemented method of claim 1 further comprising:
   computing a term frequency-inverse document frequency representation of a word count vector.

4. The computer implemented method of claim 3 further comprising:
   computing a hash of said term frequency-inverse document frequency representation of said word count vector.

5. The computer implemented method of claim 4 wherein said hash comprises a MurmurHash function.

6. The computer implemented method of claim 1 wherein said determining comprises a Jaccard similarity.

7. The method of claim 1, wherein a number of words in each said book is used to determine a measure of similarity such that books that are less than a predetermined number of words with respect to similarity detection are discarded.

8. An article of manufacture including a computer readable medium having instructions stored thereon that, responsive to execution by an electronic system, cause said electronic system to perform operations comprising:
   computing a hash of each word in a collection of books to produce a numerical integer token using a reduced representation;
   computing an Inverse Document Frequency (IDF) vector comprising a number of books said token appears in, for every token in said collection of books;
   creating a token occurrence count vector for each said book in said collection;
   normalizing said token occurrence count vector using said IDF vector to create a Term Frequency-Inverse Document Frequency (TF-IDF) vector;
   generating, for each said book, a first reduced TF-IDF vector by removing a TF-IDF term with highest weight from the TF-IDF vector;
   generating, for each said book, a second reduced TF-IDF vector by removing two TF-IDF terms with highest weights from the TF-IDF vector;
   generating, for each said book, three variants of binary vector representations by applying random projections to the TF-IDF vector, the first reduced TF-IDF vector, and the second reduced TF-IDF vector,
   creating a similarity score for each variant of binary vector representations of a target book by comparing respectively with counterpart variant from each of a list of candidate books;
   combining the multiple similarity scores to arrive at a final similarity measurement; and
   using a trained machine learning algorithm, determining whether each of said list of candidate books is similar to said target book based at least in part on the final similarity measurement.

9. The article of manufacture of claim 8 wherein said operations further comprise:
creating an efficient data structure to create a reduced list of potentially matching books for each said book in a comparison space to reduce computational costs.

10. The article of manufacture of claim 8 wherein said operations further comprise:
computing a term frequency-inverse document frequency representation of a word count vector.

11. The article of manufacture of claim 10 wherein said operations further comprise:
computing a hash of said term frequency-inverse document frequency representation of said word count vector.

12. The article of manufacture of claim 11 wherein said computing a hash comprises a MurmurHash function.

13. The article of manufacture of claim 8 wherein said determining comprises a Jaccard similarity.

14. An electronic system comprising:
one or more processors;
a memory coupled to said one or more processors, wherein said memory comprises a plurality of electronic books;
wherein said electronic system is configured to:
compute a hash of each word in a collection of books to produce a numerical integer token using a reduced representation;
compute an Inverse Document Frequency (IDF) vector comprising a number of books said token appears in, for every token in said collection of books;
create a token occurrence count vector for each said book in said collection;
normalize said token occurrence count vector using said IDF vector to create a Term Frequency-Inverse Document Frequency (TF-IDF) vector;
generate, for each said book, a first reduced TF-IDF vector by removing a TF-IDF term with highest weight from the TF-IDF vector;
generate, for each said book, a second reduced TF-IDF vector by removing two TF-IDF terms with highest weights from the TF-IDF vector;
generate, for each said book, three variants of binary vector representations by applying random projections to the TF-IDF vector, the first reduced TF-IDF vector, and the second reduced TF-IDF vector,
create a similarity score for each variant of binary vector representations of a target book by comparing respectively with counterpart variant from each of a list of candidate books;
combine the multiple similarity scores to arrive at a final similarity measurement; and
using a trained machine learning algorithm, determine whether each of said list of candidate books is similar to said target book based at least in part on the final similarity measurement.

15. The electronic system of claim 14 further configured to: compute a term frequency-inverse document frequency representation of a word count vector.

16. The electronic system of claim 15 further configured to:
compute a hash of said term frequency-inverse document frequency representation of said word count vector.

17. The electronic system of claim 16 wherein said hash comprises a MunnurHash function.

18. The electronic system of claim 14 further configured to:
determine whether two books are similar based on a comparison of more than one type of said similarity scores by using a Jaccard similarity.

* * * * *